United States Patent [19]

Zagoroff

[11] E Re. 28,665

[45] Reissued Dec. 23, 1975

[54] HEAT GUN

[76] Inventor: Dimiter S. Zagoroff, 4 Brighman St., East Boston, Mass. 02128

[22] Filed: Oct. 29, 1974

[21] Appl. No.: 518,241

Related U.S. Patent Documents

Reissue of:

[64] Patent No.: 3,779,694
Issued: Dec. 18, 1973
Appl. No.: 197,207
Filed: Nov. 10, 1971

[52] U.S. Cl. ..... 431/347; 431/158; 431/352
[51] Int. Cl.[2] ..... F23D 13/12
[58] Field of Search ..... 431/158, 347, 351–355; 126/226, 229, 231, 233, 237, 238, 401, 403, 406

[56] References Cited

UNITED STATES PATENTS

| | | | |
|---|---|---|---|
| 1,921,152 | 8/1933 | Caldwell | 431/158 |
| 1,925,183 | 9/1933 | Forster | 431/353 |
| 2,001,739 | 5/1935 | MacGregor | 431/352 |
| 2,398,654 | 4/1946 | Lubbock et al. | 431/352 |
| 2,578,101 | 12/1951 | Stalego | 431/158 |
| 2,666,480 | 1/1954 | Peterson | 431/344 |
| 2,746,529 | 5/1956 | Kamm et al. | 431/158 |
| 3,299,940 | 1/1967 | Phillips et al. | 431/347 |
| 3,385,381 | 5/1968 | Calaman | 431/158 |
| 3,506,198 | 4/1970 | Van Der Zwaal | 431/354 |
| 3,574,506 | 4/1971 | Locke | 431/344 |

*Primary Examiner*—Carroll B. Dority, Jr.

[57] ABSTRACT

Hand held heat gun producing heated air in 250° to 1,000° F range employs high performance internal combustion burner discharging exhaust gas at velocity above 4,000 feet per minute and temperature on order of stoichiometric burning temperature, i.e. 3,450 °F for propane fuel. High velocity exhaust gases enter mixing zone preferably in a divergent manner and with perimeter of gas flow cross-section at least 25 percent greater than the perimeter of a circle of equal area, to provide an extended gas-air interface The exhaust gas has a high volume pumping and mixing action upon ambient air, producing in a practical small distance a useful flow of treating air at the desired temperature. Preferably the burner outlet is of elongated form with decreasing cross-section towards outlet, e.g. a multiple legged outlet cross-section. Another form has a shower-head like series of small outlets, with diverging axes. Preferably a positioning means set a minimum distance between work piece and outlet, to ensure mixing. Where the exhaust gas stream is exposed to admission of increasing air along the length, the positioning means sets the working temperature. Preferably a shield extends about the exhaust gas stream, preferably in the form of a tube with space for ambient air. With apertures along the tube length, the mass of air increases in mass and decreases rapidly in temperature there along, so length sets discharge temperature. With a closed wall tube the tube cross-section and its inlet in the vicinity of the burner outlet defines the amount of ambient air entrained and thereby sets the discharge temperature. Burners useful in this heat gun are of high capacity type with jet pump feed, pressure recovery passage and flame holder positioned at entry of fuel mixture into the burner chamber.

7 Claims, 15 Drawing Figures

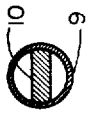
FIG 9
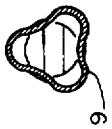
FIG 8
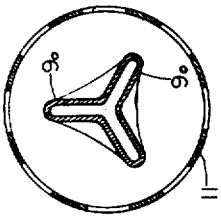
FIG 7
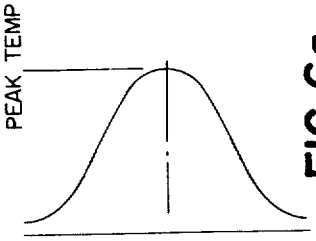
FIG 6a
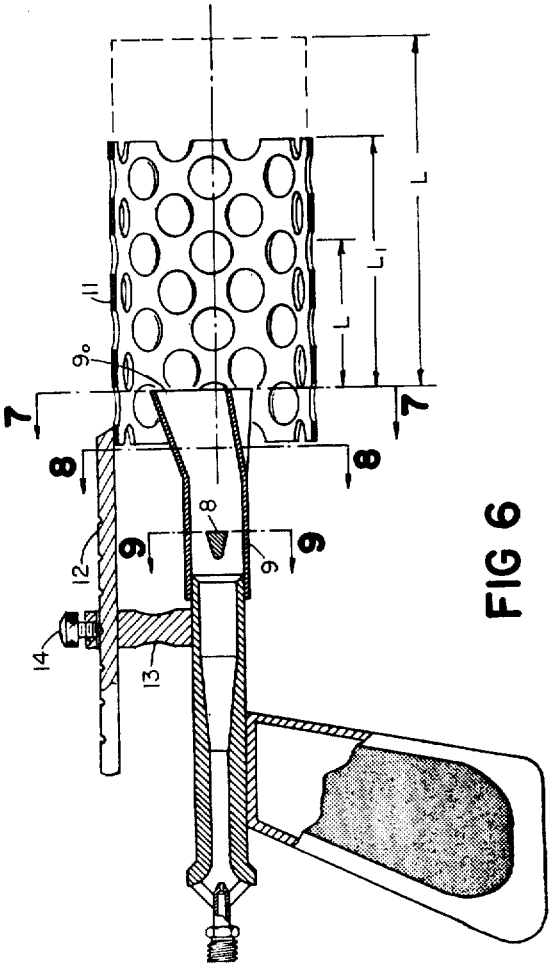
FIG 6
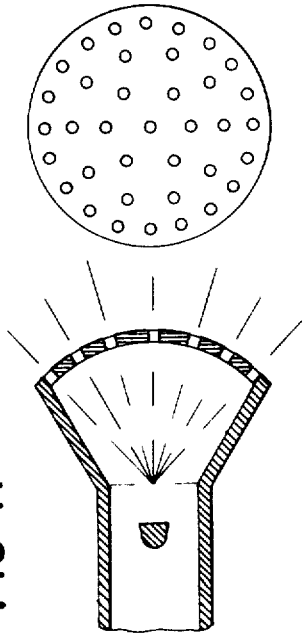
FIG 12
FIG 11

HEAT GUN

Matter enclosed in heavy brackets [ ] appears in the original patent but forms no part of this reissue specification; matter printed in italics indicates the additions made by reissue.

Numerous applications in industry and home require low temperature heating, for example heating of plastics, to shrink film and to weld and soften tubing, and putty and paint, to soften and remove or dry. Low temperature, in the range of 250° to 1,000° F, is extremely important since higher temperatures lead to blistering, cracking and charring of these inherently low temperature materials. The most widely used tool for this purpose is the electric heat gun. An electric blower passes cold air over a resistance heating element, and the hot air is directed at the work piece. Two disadvantages are that the power is limited to 3 kw using common electric outlets rated for 30 amp fuses and the tool is not usable in the field where electricity is not available.

To get around the first limitation, units have been built in which a gas flame supplies the heat and a blower is used to mix in tempering air. These units, incorporating two different power systems, are relatively complicated, bulky, and expensive. a typical 25 kw unit intended for hand held use weighs 12 lbs.

Units that rely on fuel alone, such as hand held torches have the problem that the flame temperature of common fuels such as natural gas or propane are quite high, above 3,000° F, many more times the desired temperature. In an attempt to avoid overheating the product, efforts have been made to slow down the flame being applied to the work piece by means such as spreaders, or by employing fuel rich, so-called yellow flames, but still hot spots, overheating, scorching and charring problems persist.

I have discovered that I can achieve a much more satisfactory low temperature heating device capable of use as a tempered air heat gun using a flame alone by employing high velocity, intense burning rather than the common low velocity, diffused burning pattern. This finding appears at first sight contradictory. Commonly, higher velocity burners are employed to achieve faster, more intense heating rates. This behaviour can be illustrated by plotting the time needed to start melting the end at e.g. a copper piece using the same energy input but varying the exhaust gas velocity directed against the copper. The inference here is that when more gentle heating is sought, [low] *lower* velocities should be employed. The gas torches described above attempt to employ this principle to achieve gentle heating.

I have realized the practical importance in this context of the fact that, provided the work piece is held some distance away from the burner, quite beyond the flame, extremely high velocities lead to more gentle and uniform heating which can be controlled to the degree required. This behaviour can be illustrated as a plot of the peak temperature of the products measured a distance away from a 15,000 Btu/hr burner as a function of burner exhaust gas velocity. If a temperature of 1,000° F is sought within a distance of 9 inches velocity of 100 ft/sec will succeed. A high velocity burner according to my invention will reach a desired temperature within a shorter distance than prior art low velocity burners of the same fuel consumption.

These good results are [attibutable] *attributable*, it is believed, to a combination of factors. The much higher velocity (for a burner of given fuel consumption) leads to a smaller area outlet aperture, which leads to a larger ratio of cross-section perimeter to cross-section area of the stream, which leads to a more effective pumping rate and mixing rate for a given length of the mixing zone. This can be enhanced by flattening the outlet area or otherwise shaping to get a large perimeter of gas-to-air interface. As more and more cold air is drawn in, the momentum of the exhaust gases is spread over a greater air mass however the velocity at the work piece remains sufficiently high to achieve good heat transfer.

Furthermore the short time it takes for the exhaust gases from my system to reach treating temperature means that they are not subject to detrimental buoyancy forces. Note that for slower burner output velocities, and slower cooling found in prior devices, the stream of gaseous products is exposed for a quite long time to the effects of the general surroundings as it moves to the work piece and it starts curving upwards due to buoyancy forces and becomes seriously prone to being deflected by drafts of air, becoming uncontrollable.

I thus propose to construct a heat gun with a high velocity burner to entrain air to produce an air blast of intermediate temperature. In one preferred embodiment the air entrainment can take place as in a free jet with a predetermined distance between burner and work piece. The entrainment zone preferably is within an open metal cage, one function of which is to space the burner predictably from the work piece to assure a predetermined blast temperature delivered to the work piece and another function is the admission of additional air along the length. The peak gas product temperature is a predictable function of spacing to the work piece, thus an adjustable cage or other standoff or positioning means can be preset and precalibrated for different output temperature requirements.

Another preferred embodiment employs a closed mixing tube of bigger (by at least 5 time) cross-sectional area than the burner outlet area. Given a sufficient length of mixing tube, generally 3 to 7 diameters, or shorter where highly dispersive burner outlets are used, this construction assures complete mixing of the burner products with the entrained air resulting in high uniformity in temperature of the resulting stream. The degree of temperature attenuation, (or mixing ratio) is here governed by the ratio of the mixing tube and burner outlet cross-sectional area, and thus a desired temperature can be reproduced repeatedly by the predetermined sizing.

In preferred embodiments the outlet of the combustion chamber is shaped such that the outlet cross-sectional area and the down stream cross-section assumes a shape with a perimeter substantially greater than the radius of a single circle of the same area. Such outlets typically take the shape of slits, or multiple rounds. By this means the mixing length to achieve a desired temperature attenuation is reduced in direct proportion to the ambient-to-exhaust gas interface, defined by the exposed perimeter of the stream cross-section. This behaviour can be illustrated by comparing the mixing length of two burners having the same capacity and same exhaust gas velocity but different combustion chamber outlet configurations. An outlet that has at least 25 percent more flow perimeter than a round outlet achieves a desired temperature such as 600°F in 12 inches, contrasted with 16 inches for the circular outlet. For success as a practical hand held burner for e.g. applications by power line repairmen, where too long a device is unwieldy, it is important that the perimeter thus be greater by 25 percent than the circle of equal flow area.

Further reduction in mixing length can be achieved if the combustion chamber is shaped such that the streamlines of the exhaust gases assume a divergent pattern from the centerline, so that the perimeter of the stream cross-section downstream of the outlet is greater than at the outlet and to separate the exhaust gas molecules from each other as much as possible to maximize exposure to and mixing with ambient air. In the case of multiple round outlets such a pattern can be achieved by inclining the axis of the outlet nozzles away from the center line. In the case of slits, such a pattern can be achieved by tapering the walls of the combustion chamber away from the center line but maintaining a constantly decreasing cross-sectional area of the chamber to avoid diffusion or separation of the flow inside the chamber.

For other [feature] *features* of the invention reference is made to the abstract, which is incorporated herein, and to the following description of preferred embodiments, the drawings and the claims.

FIG. 1 is a partially diagrammatic vertical cross-sectional view of a preferred embodiment having a ducted mixing chamber and a flattened and diverging burner outlet.

FIGS. 1a, 2, 3 and 4 are transverse cross-sections taken on lines 12, 2, 3 and 4 respectively in FIG. 1.

FIG. 6 is a view similar to FIG. 1 of a second preferred embodiment;

FIG. 6a is a temperature profile taken across the end of the cage and

FIGS. 7, 8 and 9 are transverse cross-sectional views taken on lines 7, 8 and 9 respectively of FIG. 6.

Figures 1, 1A, 1B, 2, 3, 4, 5:
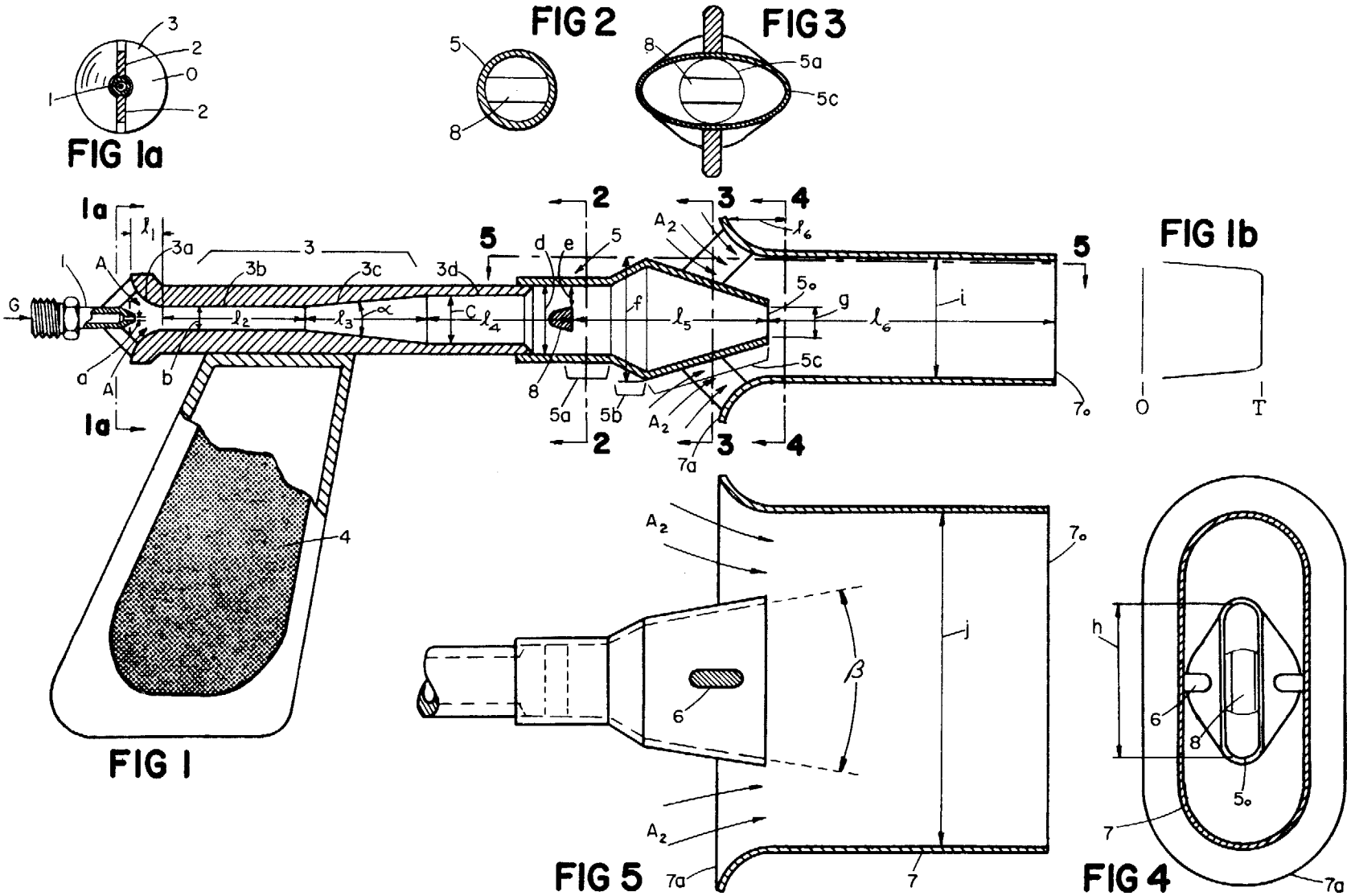
FIG. 5 is a downward view taken on line 5 of FIG. 1.
FIG. 1b is a temperature profile taken across the end of the duct.
Figure 10:
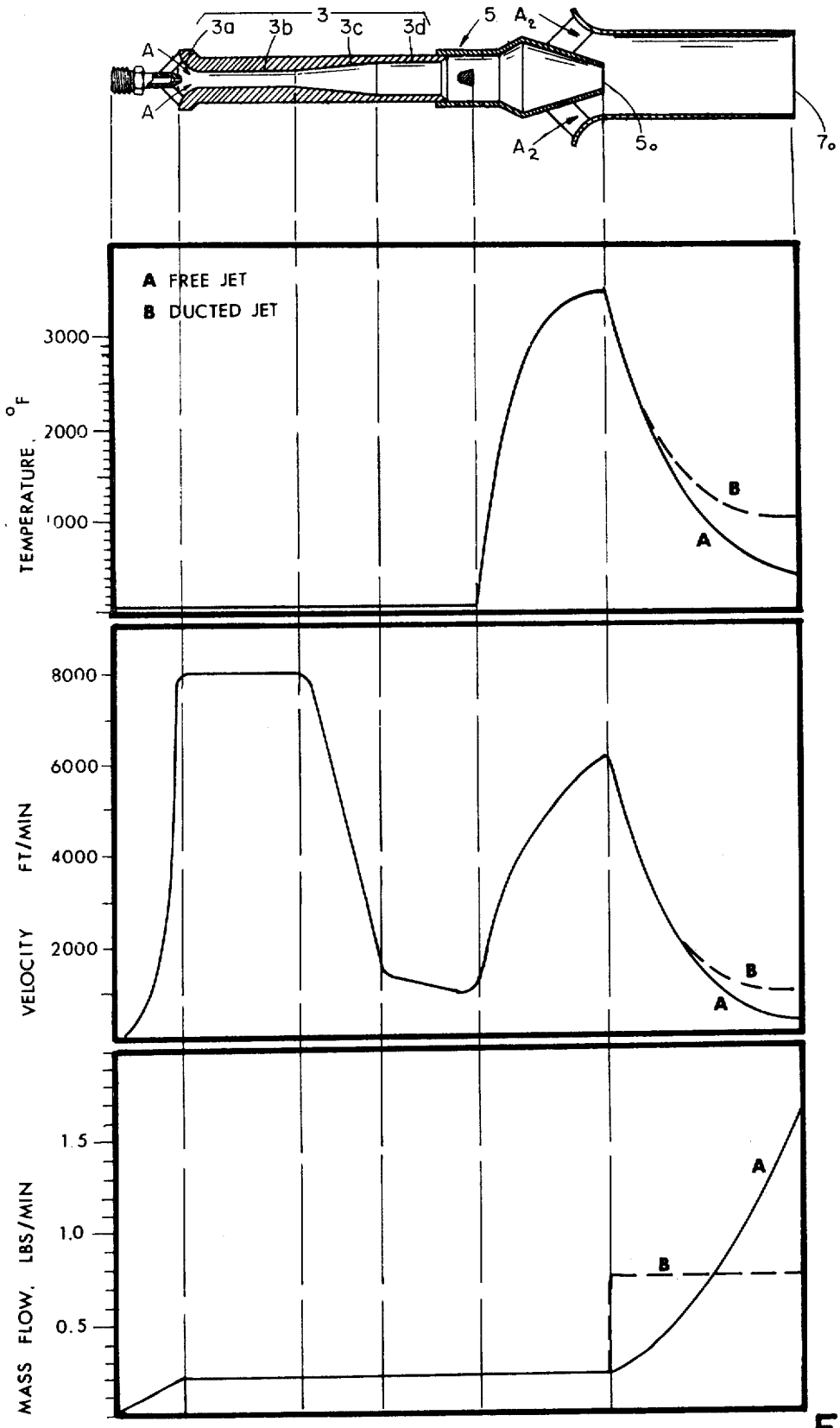

FIG. 10 is a series of plots illustrating temperature, velocity and mass flow of the embodiment of FIG. 1, with and without the duct;

FIGS. 11 and 12 are corss-sectional and end views of another preferred embodiment employing multiple burner outlet passages.

Referring to FIGS. 1–5 pressurized gas G passes through nozzle 1. The nozzle aims into a duct 3. The nozzle-duct combination is commonly known as a jet pump and its function is to entrain air A from openings O around the nozzle, between struts 2, see FIG. 1a. The duct comprises a first section of rounded form 3a, then a straight section 3b followed by divergent section 3c and then a short length of straight section 3d. The pump formed by rounded inlet, and subsequent straight, divergent and straight sections provide a fuel-air mixture at as high a pressure as possible, typically 2 inches water column, up to 4 inches water column, assuming a pumping pressure of 20 psi for gas G. Handle 4 supports the duct 3 which supports all else.

The mixture is directed into the burner. The burner consists of an internal combustion chamber 5 and the bluff body flameholder 8. Gas is burned in the combustion chamber. Flame is prevented from flashing back into the jet pump because of the design of the flameholder. Passages, dimension e, are so small that the gas velocity therethrough is greater than the burning velocity so the flame simply cannot travel upstream.

At section 2 the combustion chamber is cylindrical, and then flattens out, FIG. 3. In this embodiment, with a spreading flow of the exhaust gases it is important that in the latter part of the burner, after combustion has occurred, the passage has equal or as shown, decreasing cross-sectional area while it fans out in one direction to increase the wetted perimeter. The flow cross-section area of FIG. 3 is larger than the outlet $5_0$, FIG. 4. The gases are thus accelerated as they come out of the burner. The geometry is practicularly important in this latter half of the burner, to maintain velocity and avoid separation of the stream from the diverging walls.

In this particular burner embodiment there is first a cylindrical section 5a less than one diameter in length from the flameholder and then a transition section 5b of conical form terminating less than one diameter length from the cylindrical section. From that position which is the widest cross section of the burner, the passage 5c cross section area decreases. In operation combustion initiates at the flameholder and spreads downstream.

Referring to the velocity profile FIG. 10 of air A, the air enters the rounded inlet 3a at a slow velocity and speeds up to a very high velocity inside pump 3 reaching a maximum around 8,000 fpm in section 3b. In the diffuser 3c it slows, the velocity energy converting to static pressure head. When the gas enters the burner 5 and is heated it tends to expand and it increases in velocity again to a maximum in the outlet $5_0$ of the burner at dimension g, to around 6,000 fpm. From then on the gas starts to entrain large quantities of treating air $A_2$ and the mixture slows down. At the outlet $7_0$ the air velocity will generally be greater than 75 feet per second, ranging from 100 to 200 feet per second. Graph lines A represent performance of a free jet, i.e. where free flow of air occurs into the exhaust stream at all points along jet length. Dashed lines B represent use of the closed wall tube, 7.

In effect the hot gases from the burner 5 drive a second jet pump, to pump, mix and heat ambient air $A_2$. The duct 7 of this second jet pump in FIG. 1 has a cross section area which as is shown in FIG. 4 is substantially larger than the outlet area $5_0$ of the burner, with an order of magnitude from 5 to 50. The air inlet 7a to duct 7 is of corresponding size, due to its flared form, positioned by struts 6 concentrically about the burner 5. The velocity of the hot gases entrains cold air, and this stream mixes in the duct, the reason for the duct being to equalize the velocities and the temperature of the mixture. If the duct were cut too short a hot core and a cold outside would be found. Complete mixing occurs so that after a length of more than about 3 diameters up to 7 depending upon design, equal temperature and equal velocity come out. The amount of air entrained is governed primarily by the area ratio of duct 7 to the burner outlet area.

In a typical construction in accordance with the embodiment of FIG. 1 the dimensions may be selected as follows:

| | | | |
|---|---|---|---|
| a | 0.0187 in. | $l_1$ | 0.250 in. |
| b | 0.235 in. | $l_2$ | 1.500 in. |
| c | 0.575 in. | $l_3$ | 2.800 in. |
| d | 0.670 in. | $l_4$ | 1.000 in. |
| e | 0.134 in. | $l_5$ | 1.500 in. |

-continued

| | | | |
|---|---|---|---|
| f | 0.890 in. | $l_6$ | 4.000 in. |
| g | 0.340 in. | | |
| h | 1.300 in. | Angle $\alpha$ | 7° |
| i | 1.250 in. | B | 20° |
| j | 3.500 in. | | |

With this particular construction with propane introduced at 22½ psig, at a fuel rate of 0.0116 lb/min, corresponding to 13,500 BTU/hour, the hot air gun will deliver 28.6 cfm of air at 1,000° F, velocity 1,200 fpm.

In accordance with the embodiment of FIG. 6 the mixing process can be obtained without the closed-wall duct in what is called a free jet in which air can enter the mixing stream at any point downstream. FIG. 6 has the same jet pump in common as FIG. 1. It shows different burner geometry 9. The burner in FIG. 6 has three outlet slits $9_0$ arranged in clover-leaf formation rather than one slit, with transition from cylindrical to that form, compare FIGS. 7, 8 and 9. Again the first half of the combustion chamber shape or cross sectional area is not critical but the latter half has ever decreasing cross-sectional areas. On the basis of wanting at least 75 feet per second outlet gas velocity, the cross-sections become calculable after the heating capacity is established. A 15,000 BTU/hour burner would typically have a 3/10 square inch of outlet area, FIG. 7, arrived at taking into consideration the maximum velocity of the generator and the amount of combustion gases.

The mixing of FIG. 6 is very length-dependent. The further downstream from the burner the more air is drawn in, the lower the temperature has dropped, see FIG. 10. This temperature attenuation curve is very predictable for each size of outlet and velocity through it. Due to the fact that there is an ever decreasing temperature, one can select the temperature wanted. To assure constant spacing, a device such as shown in FIG. 6 is employed where cage 11 serves to position the burner relative to the workpiece and still admit air for mixing. This cage can be adjusted. It consists of a strut 12 that mounts in a support post 13. It is fixed with a screw 14. This strut has indentations shown so it can be calibrated for various temperatures. This whole structure holds the cage in the calibrated position relative to the burner.

In the embodiment of FIG. 6 one needs to move the cage back and forth to establish the heated air temperature at the end of the cage. It sets a maximum temperature deliverable to the workpiece and by moving away one can set lower temperatures. Typically, to achieve the same low temperature with same burner design, the length of cage 11 beyond the burner will be less than the length of tube 7, and hence may be more convenient for certain applications. where the uniformity of the temperature of all air emitted from the outlet is important, one may choose however the embodiment of FIG. 1 over that of FIG. 6, compare FIGS. 1b and 6a and 10. Another advantage of FIG. 1 is that it is windproof in high cross winds, useful for instance in airports, railroads and power and telephone line repair.

Referring to FIGS. 10 and 11 another embodiment employs chamber outlet openings like a shower head, with axes of openings divergent from one another to provide a downwardly expanding stream.

Numerous other embodiments will be recognized to be within the scope of the invention.

I claim:

1. A hand held gun for providing a flow of heated air in the 250° F to 1,000° F range against a work object relying upon fuel alone without assistance of blowers or compressors, said gun comprising the combination of a gaseous fuel jet adapted for connection to a conventional fuel gas source such as propane having a stoichiometric burning temperature above 3,000° F, a jet pump activated by said gas jet and having an opening for drawing atmospheric air for combustion into a subatmospheric pressure region produced by said jet, said jet pump constructed to impart velocity to said combustion air by mixing, an enlarged pressure recovery passage into which the mixture of gaseous fuel and combustion air proceeds, said recovery passage constructed to convert velocity head of said gases to a pressure head exceeding atmospheric pressure, an internal combustion chamber, said chamber having an entry into which said pressure recovery passage discharges, a flame holding means at said entry and an outlet discharging combustion gases, the effective wetted perimeter of the flow cross-section of said outlet being at least 25 percent greater in length than the perimeter of a single circle of identical cross-sectional area, providing an extended interface between combustion gases discharging from said outlet and atmospheric air, and a temperature-limiting structure extending downstream of said outlet, said structure preventing direct access of the work object to said outlet and to the combustion gases emitting therefrom and defining an ambient air propelling and mixing zone through which said combustion gases flow preceding said work object, said temperature-limiting structure being open to admit atmospheric air freely, progressively to the stream of combustion gases as they proceed through said structure, the respective parts of said gun constructed to burn said fuel in substantially stoichiometric conditions and discharge said combustion gases through said outlet at a temperature exceeding 3,000° F and a velocity in excess of 4,000 feet per minute, said gun, through the cooperation of said extended combustion gas-air interface, effectively producing a flow comprised in major part of ambient air propelled and heated by said combustion gases, the effective length of said temperature-limiting structure downstream of said outlet determining the temperature of the resultant flow at the output end.

2. The gun of claim 1 having a multiplicity of elongated outlet aperture portions for combustion gases, [ and ] *said* aperture portions arranged to discharge in the same general direction into different portions of said mixing and propelling zone.

3. The gun of claim 1 wherein said temperature limiting structure comprises a shield member extending about said outlet in a spaced relation defining an axial inlet for atmospheric air adjacent said outlet and having wall portions extending downstream providing a multiplicity of lateral atmospheric air openings along the length of said temperature-limiting structure through which air may freely enter said shield, there to be propelled and heated by said combustion gases.

4. The gun of claim 1 including means fixing the downstream end of said temperature-limiting device at a predetermined position from said outlet thereby for a given fuel flow, enabling the temperature at said downstream end to be set at a predetermined level.

5. A hand held gun for providing a flow of heated air in the 250° F to 1,000° F range against a work object relying upon fuel alone without assistance of blowers or :ompressors, said gun comprising the combination of a ;aseous fuel jet adapted for connection to a convenional fuel gas source such as propane having a stoi:hiometric burning temperature above 3,000° F, a jet ıump activated by said gas jet and having an opening or drawing atmospheric air for combustion into a sub.tmospheric pressure region produced by said jet, said et pump constructed to impart velocity to said comıustion air by mixing, an enlarged pressure recovery ıassage into which the mixture of gaseous fuel and ombustion air proceeds, said recovery passage contructed to convert velocity head of said gases to a ıressure head exceeding atmospheric pressure, an inernal combustion chamber, said chamber having an ntry into which said pressure recovery passage dishharges, a flame holding means at said entry and an ıutlet discharging combustion gases, the effective weted perimeter of the flow cross-section of said outlet ıeing at least 25 percent greater in length than the ıerimeter of a single circle of identical cross-sectional .rea, providing an extended interface between combusion gases discharging from said outlet and atmospheric ıir, and a temperature-limiting structure extending lownstream of said outlet, said structure preventing lirect access of the work object to said outlet and to he combustion gases emitting therefrom and defining ın ambient air propelling and mixing zone through vhich said combustion gases flow preceding said work object, said temperature -limiting structure comprising an elongated tube extending about said outlet in a spaced relation defining an axial inlet for induced flow of atmospheric air adjacent said outlet, said tube having a closed wall along its length and the flow cross-section and capacity of said air inlet and said tube being more than five times greater than the flow cross-section and flow capacity of said burner, the respective parts of said gun constructed to burn said fuel in substantially stoichiometric conditions and discharge said combustion gases through said outlet at a temperature exceeding 3,000° F and a velocity in excess of 4,000 feet per minute, said gun through the cooperation of said extended combustion gas-air interface effectively producing a flow comprised in major part of ambient air propelled and heated by said combustion gases, the *ratio of the* effective flow capacity of said [air inlet] *tube to that of said outlet* determining the temperature of the resultant flow at the output end.

6. The [head] *heat* gun of claim 1 wherein said burner has a constant or decreasing flow cross-section area leading to said outlet.

7. The [head] *heat* gun of claim 1 wherein said outlet comprises an elongated outlet aperture, said burner having walls diverging in the direction of elongation of said aperture.

* * * * *